United States Patent [19]

Miles

[11] Patent Number: 5,338,247
[45] Date of Patent: Aug. 16, 1994

[54] BATTERY POWERED MODEL CAR

[76] Inventor: Jeffrey A. Miles, 14730 Harrison, Livonia, Mich. 48154

[21] Appl. No.: 968,999

[22] Filed: Oct. 30, 1992

[51] Int. Cl.⁵ .................. A63H 17/26; B60G 15/00
[52] U.S. Cl. .................................... 446/456; 446/465; 446/466; 280/688; 280/720; 180/56
[58] Field of Search ............ 446/456, 462, 466, 469, 446/457, 460, 465; 180/56, 61, 312; 280/688, 718, 720, 712, 112.1, 111

[56] References Cited

U.S. PATENT DOCUMENTS

| | | | |
|---|---|---|---|
| 3,121,294 | 2/1964 | Balthazor | 446/466 |
| 3,350,813 | 11/1967 | Isaacson | 446/462 |
| 3,460,644 | 8/1969 | Porsche et al. | 180/56 |
| 3,497,025 | 2/1970 | Rosenkrands | 180/56 |
| 3,501,863 | 3/1970 | Matsushiro . | |
| 3,751,065 | 8/1973 | Sullivan | 280/106 |
| 3,752,246 | 8/1973 | Sullivan | 446/469 X |
| 4,159,126 | 6/1979 | Raleigh | 446/465 X |
| 4,429,760 | 2/1984 | Koizumi et al. | 280/282 X |
| 4,730,838 | 3/1988 | Takahashi | 280/688 X |
| 5,108,126 | 4/1992 | Banse | 280/668 |
| 5,120,254 | 6/1992 | Daniels et al. | 446/466 |

OTHER PUBLICATIONS

*Radio Control Car Action,* "New Trinity Car Dominates Worlds," Nov. 1992, p. 109 (author unknown).
*The Starting Grid,* "The World Returns to Southern California," Apr. 1992, p. 20 (author unknown).
*Radio Control Car Action* ad entitled "The Racer's Choice," Nov. 1992, p. 108.

*Primary Examiner*—Mickey Yu
*Attorney, Agent, or Firm*—Brooks & Kushman

[57] ABSTRACT

A rear suspension for battery powered on-road scale model car of the type having a straight rear axle and a nonindependent rear suspension is disclosed. The model car includes a chassis having a central longitudinal axis with a centrally located battery pack. A pair of remotely steerable wheels are pivotably affixed to the chassis front end. A motor pod pivotably supports a pair of rear wheels interconnected by a straight rear axle and includes a mechanism for attaching an electric drive motor. The rear suspension elastically attaches the motor pod to the chassis for limited vertical bounce movement and limited torsional roll movement of the motor pod relative to the chassis. The rear suspension components are spaced sufficiently from the battery pack to provide clearance for a row of batteries oriented centrally along the chassis. The central battery design minimizes mass moment of inertia of the model car measured about the longitudinal axis resulting in improved maneuverability.

20 Claims, 4 Drawing Sheets

BATTERY POWERED MODEL CAR

FIELD OF INVENTION

This invention relates to battery powered model cars and more particularly to model cars of the type having a straight rear axle and a non independent rear suspension.

BACKGROUND OF THE INVENTION

Radio controlled operated model cars have become a very popular pastime. An organization of radio control model car owners has been formed and a body of rules implemented regulating vehicle design within specified classes. Several classes, specifically one-tenth scale and one-twelfth scale electric on-road model cars are required to have a straight axle design. Independent rear suspension is not allowed. Model cars of this design are also limited to the number and total weight of the batteries utilized. Depending upon the vehicle size, the vehicles will either have four or six battery cells.

Prior art model cars of straight axle design utilize a battery orientation referred to as saddle pack. In the saddle pack design, half of the batteries were oriented on each side of the chassis longitudinal axis immediately forward of the vehicle rear wheels. The vehicle rear suspension which connects the chassis to the motor pod assembly was oriented between the two rows of batteries in the saddle pack configuration.

The most common rear suspension design comprised a flat T-shaped spring affixed to the motor pod and attached to the chassis by a pair of spaced apart pivot sockets. The T-shaped spring pivots about the two longitudinally aligned pivot sockets to facilitate a torsional movement of the motor pod relative to the chassis. The T-shaped spring bends in an S-shape during rear axle bounce. Conventional rear suspension also has a strut which extends longitudinally between the chassis and the motor pod at a location spaced above the T-shaped spring. The telescopic strut provides additional spring load to limit rear axle bounce in addition to providing damping.

SUMMARY OF THE INVENTION

An object of the present invention is to improve model car performance and response in turning maneuvers. The advantage of the present invention is the reduction in vehicle mass moment of inertia about the vehicle's longitudinal axis for a given vehicle overall mass. Another object of the present invention is to provide a very simple highly durable model car, and a suspension with minimal change in the manufacturing costs.

Accordingly, a model car of the present invention includes a chassis having a front and rear end provided with a longitudinal axis extending therebetween. The chassis is provided with a series of battery mounts for retaining a row of batteries centrally along the chassis longitudinal axis. A pair of rear wheels are interconnected by a straight rear axle. The rear axle is mounted upon a motor pod which includes an attachment for the electric drive motor. The vehicle rear suspension is located forward the rear axle and elastically retains the motor pod to the chassis while permitting a limited vertical bounce and limited torsional movement of the motor pod relative to the chassis along the chassis longitudinal axis. The rear suspension provides sufficient clearance with the chassis to enable the batteries to be oriented centrally along the longitudinal axis thereby improving responsiveness as a result of the reduction in the mass moment of inertia of the model car measured about the longitudinal axis.

The preferred rear suspension includes a pivot for connecting the motor pod to the chassis to enable limited free relative movement therebetween about a transverse pivot axis. The roll limiting spring mechanism is provided which connects the motor pod to the chassis providing an elastic resistance to torsional movement of the motor pod about the chassis longitudinal axis. Additionally, a telescopic strut assembly extends between the motor pod and the chassis. The strut includes a spring which is elastically compressed in response to the upward pivotal movement of the motor pod about the transverse pivot axis. The telescopic strut provides elastic force which limits rear axle bounce.

BEST MODE FOR CARRYING OUT THE INVENTION

The first embodiment of the invention is illustrated with respect to FIGS. 1-4. Model car 10 is a remote controlled battery powered scale model race car of the on-road type. All cars of this type are required by the standard racing rules of ROAR (Radio Operated Auto Racing, Inc.) to have a straight rear axle and a non-independent rear suspension.

Model car 10 has a chassis 12 which is generally rectangular in plan view. The chassis is formed of a thin graphite sheet. Chassis 12 has a front end 14 and a rear end 16 generally aligned along a longitudinal axis 18 shown in FIG. 2. A series of batteries 20 are mounted in a row centrally along the chassis longitudinal axis. Batteries 20 are generally cylindrical in shape with their cylindrical axis oriented perpendicular to longitudinal axis 18. Alternatively, two rows of coaxially aligned batteries could be oriented parallel to the longitudinal axis on immediate opposite sides thereof in order to form a generally central row with very similar weight distribution. It is preferred that the batteries be aligned perpendicular to the longitudinal axis as illustrated in order to maintain chassis strength and lower the battery center of gravity as far as possible.

In order to retain batteries 20, a series of slots 22 or depressions are cut in the chassis which receive the batteries. The formation of slots 22 enable the battery center of gravity to be lower approximately the thickness of the graphite sheet forming the chassis. Batteries are retained to the chassis in a conventional manner using a strap extending over the battery or the like.

The model car 10 has a pair of remotely steerable front wheels 24 and 24' pivotably mounted adjacent the chassis front end on opposite sides of the longitudinal axis. The front wheels of a conventional design and are remotely steerable by conventional steering linkage 26 and a servo motor 28. Servo motor 28 is controlled by radio receiver 30 which is remotely operated by a transmitter held by the vehicle operator. Radio receiver 30 also regulates the operation of drive motor 32. Drive motor 32 is provided with a pinion 34 which drives ring gear 36. Drive motor 32 drives the rear wheels 38 and 38' of the car. The rear wheels are interconnected by a straight axle assembly 40.

Axle assembly illustrated is a conventional on-road race car design which includes a roller ball differential 42. Axial assembly 40 is pivotably mounted upon motor pod 44 utilizing a pair of low friction roller bearings. Motor pod 44 is a rigid frame which supports the motor and the straight rear axle in parallel adjacent alignment. The motor pod includes a pair of slots 46 and 46' which serve as a means for bolting the drive motor 32 to the motor pod 44.

A rear suspension 48 is provided which elastically attaches the motor pod to the chassis rear end. Rear suspension 48 permits limited vertical bounce movement with a motor pod relative to the chassis as well as limited torsional roll movement of the motor pod about the longitudinal axis 18. In the embodiment shown in FIGS. 1–4, rear suspension 48 is made up of a T-bar 50 shown in detail in FIG. 3 and a generally U-shaped sway bar 60. The rear suspension is spaced sufficiently from the chassis longitudinal axis in order to provide clearance for the row of batteries which are oriented along the longitudinal axis. This suspension design facilitates a central battery orientation which minimizes the mass moment of inertia of the model car when measured about longitudinal axis 18.

Figure 3:
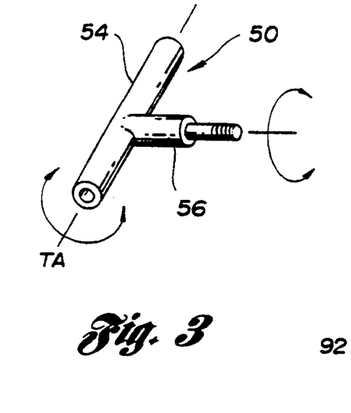
FIG. 3 is a perspective view of a t-bar pivot used in the embodiment of FIGS. 1 and 2.

T-bar pivot 50 has a transverse member 54 and a longitudinal member 56. Motor pod 44 is pivotably connected to T-bar transverse member 54 and is capable of freely rotating about transverse axis TA within a limited range sufficient to provide adequate wheel travel in bounce. T-bar pivot longitudinal member 56 pivotably cooperates with pivot block 58 which is affixed to the chassis rear end, the T-bar can rotate relative to the chassis about the longitudinal axis to allow limited torsional roll movement as would occur in a typical high speed turning maneuver.

The motor pod is maintained in normal alignment with the chassis wherein the axis of the rear axle is generally parallel to the horizontal plane of chassis 12. The roll stiffness or spring rate about the longitudinal axis is controlled by a u-shaped sway bar 60. Sway bar 60 provides a roll limiting spring which dictates roll couple. Of course, other roll limiting spring designs could be used to provide a positive self centering roll couple such as a conventional pair of transverse spring struts.

The sway bar 60 is generally U-shaped having a central portion 62 which is pivotably affixed to the motor pod and generally parallel to the transverse pivot axis of TA. U-shaped sway bar 60 has two end portions 64 and 64' which extend from the central portion 62 and are affixed to the chassis 12 on opposite sides of the longitudinal axis at a location longitudinally spaced from the sway bar central portion axis. As a the motor pod rotates relative to the chassis about longitudinal axis 18, sway bar 60 is twisted in a manner similar to sway bars typically used in automobiles. Sway bar ends 64 and 64' are pivotably attached to the chassis utilizing a conventional sway bar anchor struts 66 and 66'.

Figure 1:
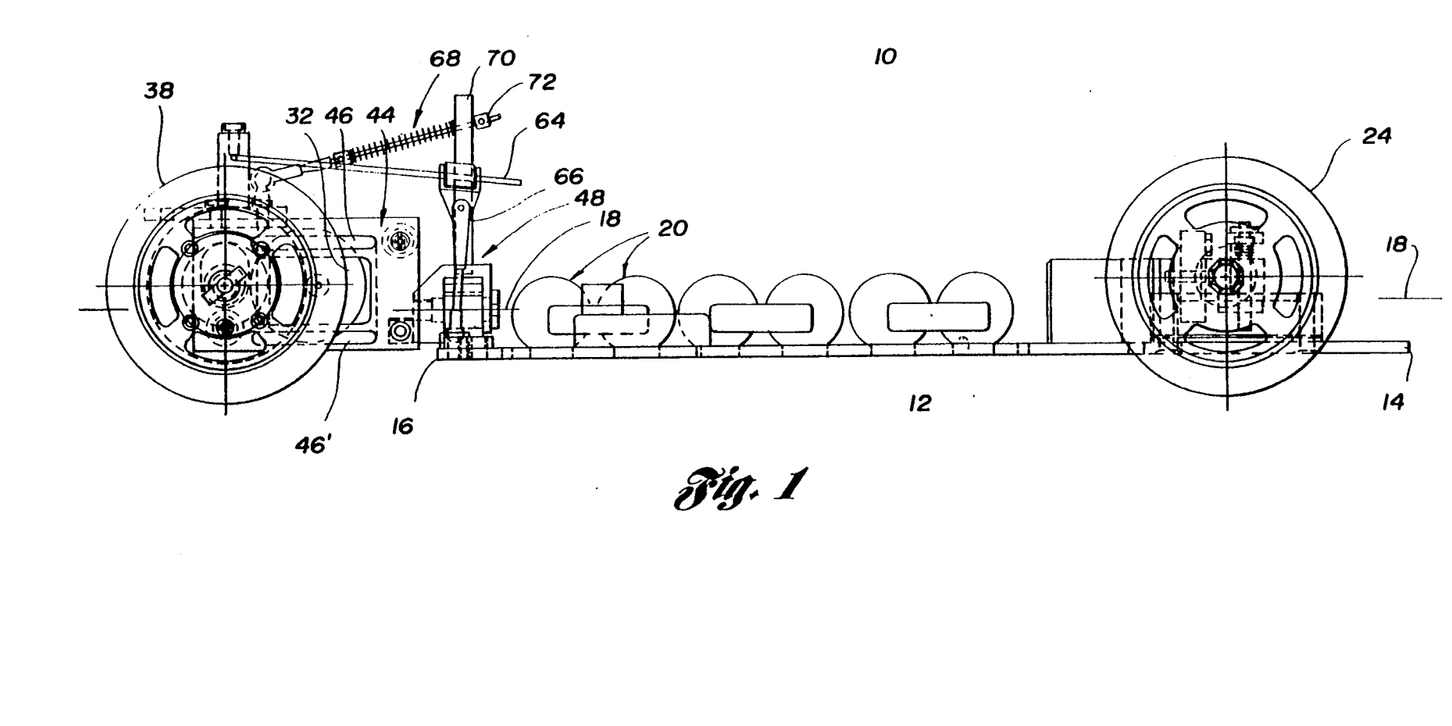
FIG. 1 is a side elevational view of a first embodiment of the model car invention.
Figure 2:
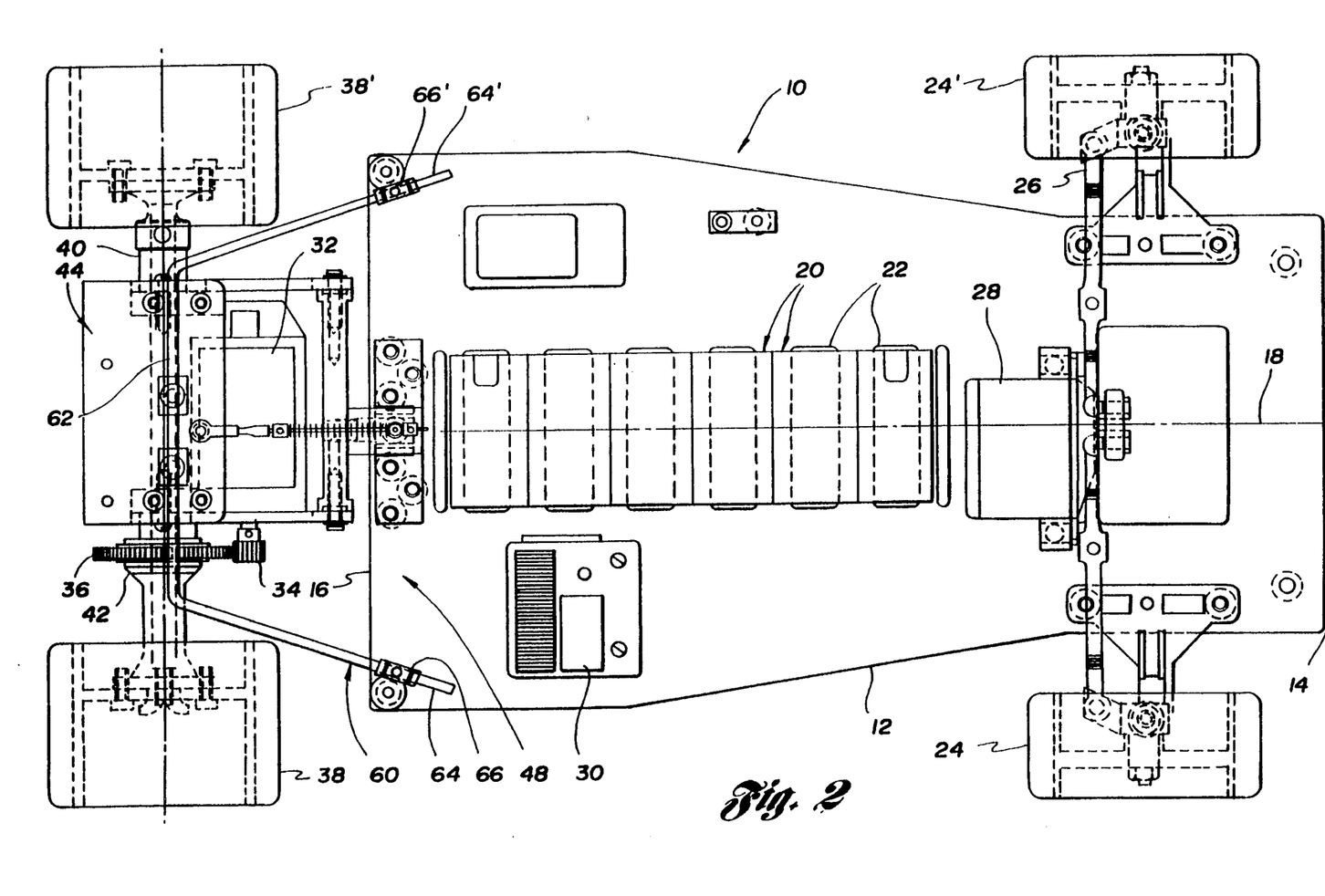
FIG. 2 is a top plan view of the model car of FIG. 1.

The spring rate of the motor pod relative to the chassis when moved upwardly in bounce is controlled by a telescopic strut assembly 68. Telescopic strut of the preferred embodiment is aligned with the longitudinal axis in plan view and extends between the motor pod 44 and chassis 12. The strut is oriented relative to the motor pod and the chassis so that the length of the strut varies as the motor pod moves in bounce. Preferably, the strut is oriented in a forwardly upwardly inclined manner relative to the longitudinal axis as illustrated in FIG. 1. Strut 68 is pivotably attached to the motor pod using a conventional ball and socket and connected to the chassis via a strut mounting post 70. Post 70 is sufficiently high to maintain the desired strut upward incline orientation. Telescopic strut 68 in the preferred embodiment includes a coil compression spring and a damper. The spring rate of the motor pod relative to the chassis and bounce is primarily controlled by a spring rate of telescopic strut 68. Due to the orientation of the strut relative to the longitudinal axis 18, a small portion of the roll coupled will be provided by a telescopic strut 68. Minimal damping in roll is provided by telescopic strut 68 as well.

Figure 4:
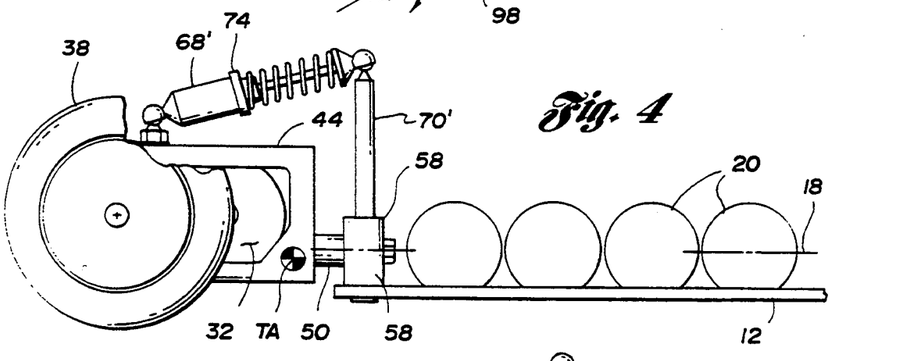
FIG. 4 is a simplified side elevational view of the model car of FIG. 1.

In order to vary the initial height of the relative chassis, the initial spring load is preferably adjustable in a conventional manner. In FIG. 1, strut 68 extends through post 70 and spring compression is adjustable via nut 72, a slightly different design telescopic strut 68' as shown in FIG. 4. Strut 68' has a pair of rod ends pivotably connected to the ball on the motor pod and on the post 70' as illustrated as illustrated. Suspension height is adjusted and struts of this design utilizing a movable stop ring 74.

By lowering the mass moment of inertia, the model car of the present design performs very responsively in turning maneuvers when compared to cars of the prior art design having saddle pack battery orientations in which half the batteries are oriented on each side of the longitudinal axis and spaced outboard therefrom sufficiently to facilitate the location of rear suspension members between the battery packs.

Figure 5:
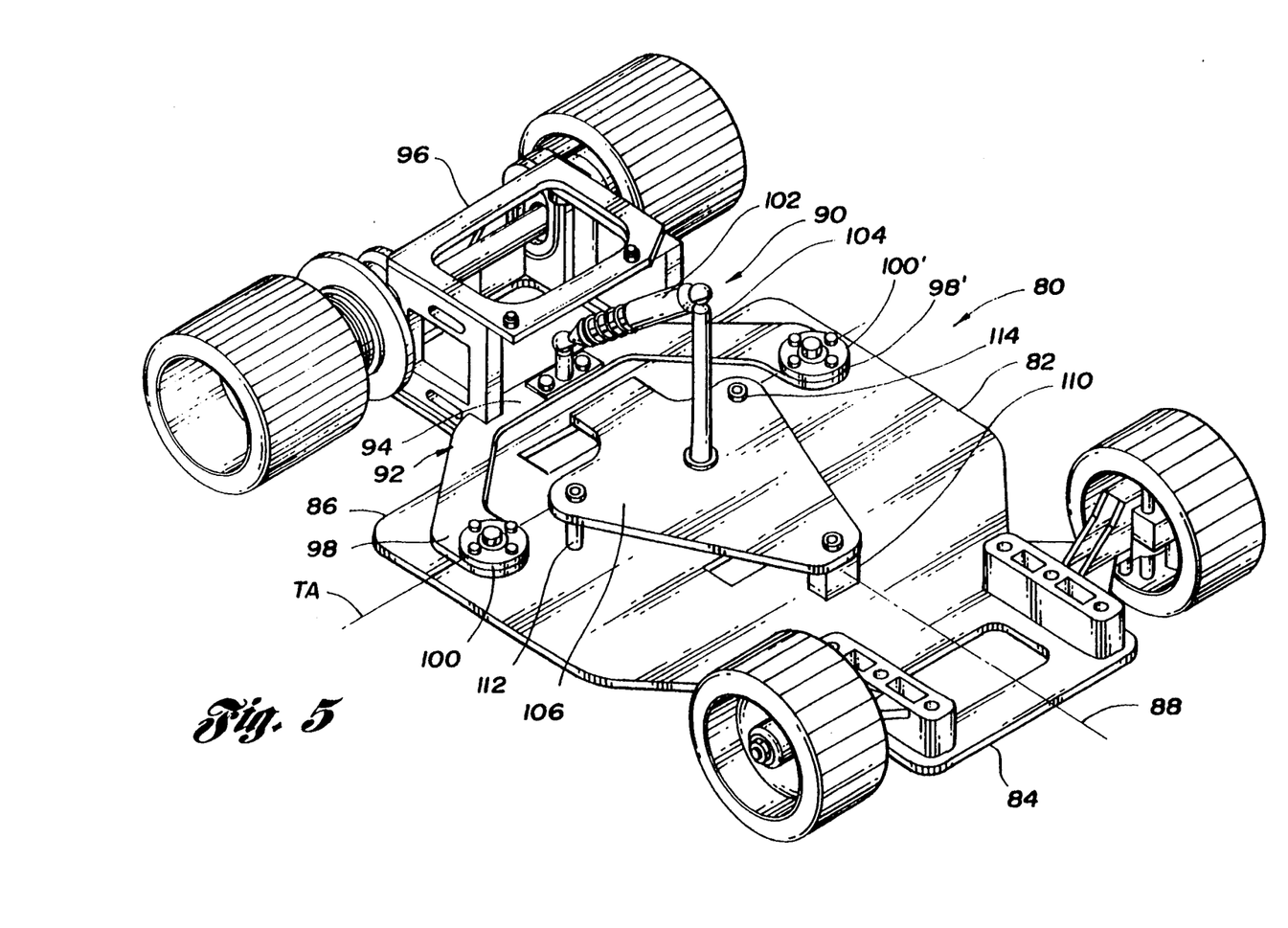
FIG. 5 is a perspective right front quarter view of a second model car embodiment.
Figure 6:
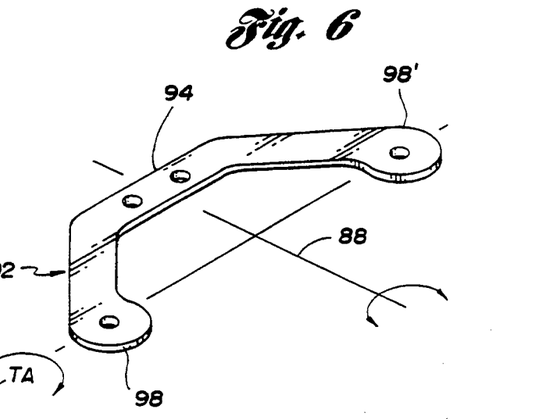
FIG. 6 is a perspective view of a leaf spring utilized in the model car of FIG. 5.
Figure 7:
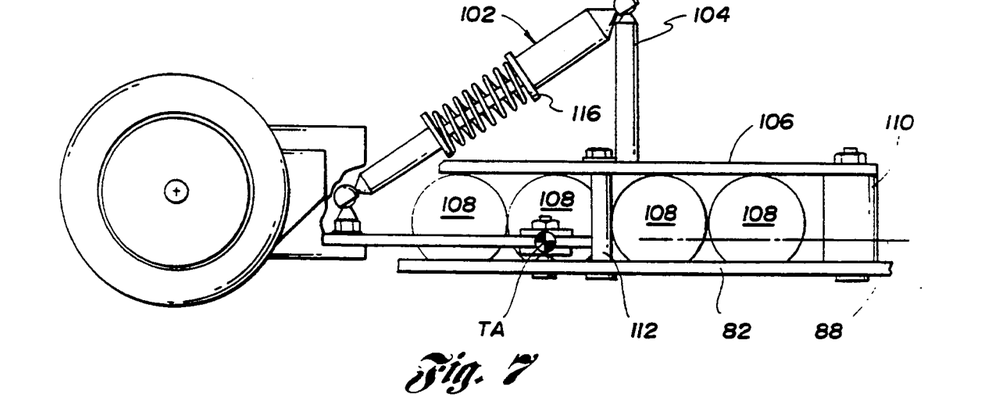
FIG. 7 is a simplified right side elevational view showing the rear suspension construction of the model car of FIG. 5.

A second embodiment of the model car of the present invention is shown in FIGS. 5–7. Second model car embodiment 80 includes a chassis 82 of generally similar construction to chassis 12 described with reference to the first model car embodiment 10. Chassis front end 84, a rear end 86 are on opposite ends of central longitudinal axis 88. A battery pack which is made up of a series of cylindrical battery cells are oriented in transverse alignment with the longitudinal axis 88. The batteries are centrally oriented on the chassis immediately forward of the chassis rear end 86.

The primary difference between model car 80 and model car 10 is a design of the rear suspension. Car 80 is provided with a rear suspension 90 which includes a generally U-shaped spring 92. U-shaped spring 92 is formed of a generally planar sheet of fiberglass or the like. The central portion of the U-shaped spring 94 is securely affixed to motor pod 96 while the U-shaped spring forward ends 98 and 98' are pivotably affixed to chassis 82 by a pair of swivel joints 100 and 100'. These swivel joints are located along a transverse axis TA which extends generally perpendicular to longitudinal axis 88. Due to the planar configuration of the U-shaped spring, the spring is very stiff when loaded transversely, yet is flexible when a motor pod is rotated in torsion about longitudinal axis 88.

Pivots 100, which may comprise assemblies as shown in FIGS. 5 and 7, enable the U-shaped spring attached to the motor pod to rotate about the transverse axis enabling the motor pod to move vertically relative to the chassis in bounce. The U-shaped spring 92 acts as a control arm. The torsional spring rate of the motor pod relative to the chassis is controlled by U-shaped spring 92. U-shaped spring 92 and pivots 100 are equivalent to T-bar 50 in the first embodiment in that they provide pivot means for connecting the motor pod to the chassis enabling limited free relative movement therebetween about the transverse pivot axis TA. Of course, other joints such as a central pivot socket with alignment pins or control arms to maintain axle alignment, could also be used.

A spring rate of bounce is controlled by telescopic strut 102. Telescopic strut 102 is affixed at one end to the motor pod 96 and affixed at its other end to post 104. Post 104 extends vertically from deck 106 which is spaced above and generally parallel to chassis 82 to provide clearance for batteries 108 therebetween. The deck 106 is affixed to the chassis by a series of spacers 110, 112 and 114. As the motor pod moves vertically in bounce, the telescopic strut is compressed. Telescopic strut 102 is preferably of a conventional design which includes a compressible coil spring and an internal damper. The static height of the rear suspension can be adjusted by moving a collar 116 axially along the strut to vary its initial length when the vehicle is at rest. As in the first embodiment, strut 104 is preferably forwardly upwardly inclined relative to the vehicle's longitudinal axis.

By utilizing the deck 106, post 104 can be moved forward relative to post 70 and model car 10 enabling the battery pack to be positioned in a more rearward location. The location of transverse axis TA is likewise significantly forward of the transverse axis in the first embodiment which enables the pivot point of the telescopic strut motor pod attachment to be located very close to the longitudinal axis. This design minimizes the interrelationship between the telescopic strut spring rate and the torsional roll couple which is generated by the generally U-shaped leaf spring 92.

The generally U-shaped spring is illustrated in greater detail in FIG. 6. The orientation of the leaf spring relative to longitudinal axis 88 and transfer axis TA are best illustrated with reference to this figure as well as FIG. 7. When the motor pod and the rear wheels were vertically moved relative to the chassis in bounce, a motor pod moves along an arcuate path rotating about axis TA.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made by substituting equivalent structures of the components disclosed without departing from the spirit and scope of the invention disclosed.

What is claimed is:

1. A remote controlled battery powered on-road scale model car of the type having a straight rear axle and a non independent rear suspension, said model car comprising:

a chassis having a front and rear end with a longitudinal axis extending therebetween and means for mounting a row of batteries centrally along said longitudinal axis;

a pair of remotely steerable front wheels pivotably affixed to the chassis front end;

a pair of rear wheels interconnected by having a straight rear axle;

a motor pod supporting the rear axle and mounting means for attaching an electric motor; and a rear suspension elastically attaching the motor pod to the chassis rear end to permit limited vertical bounce movement and limited torsional roll movement about the longitudinal axis, said rear suspension spaced sufficiently from the chassis to provide clearance for a row of batteries oriented along the longitudinal axis thereby minimizing the mass moment of inertia of the model car measured about the longitudinal axis, and said rear suspension comprising a pivot means for connecting motor pod to the chassis enabling limited free relative movement therebetween about a transverse pivot axis, a roll limiting spring comprising a component separate from the chassis and cooperating with the motor pod and the chassis providing elastic resistance to relative torsional movement about the chassis longitudinal axis, and a telescopic strut assembly having a forward end pivotally affixed to the chassis and a rearward end pivotally affixed to the motor pod, said strut having a spring which is elastically compressed in response to an upward pivotal movement of the motor pod about the transverse pivot axis.

2. The model car of claim 1 wherein said roll limiting spring substantially entirely limits torsional movement of the motor pod relative to the chassis.

3. The model car of claim 1 wherein said telescopic strut comprises a single telescopic elongate member aligned in plan view with the longitudinal axis.

4. The model car of claim 3 wherein said telescopic strut is forwardly upwardly inclined relative to said longitudinal axis and spaced from the chassis sufficiently to provide battery storage therebetween.

5. The model car of claim 1 wherein said roll limiting spring further comprises a U-shaped sway bar having a central portion affixed to the motor pod and pivotal about a sway bar axis generally parallel to the transverse pivot axis and two ends affixed to the chassis on opposite sides of the longitudinal axis at locations longitudinally spaced from the sway bar axis.

6. The model car of claim 5 wherein said two ends of the sway bar are pivotally attached to the chassis.

7. The model car of claim 1 wherein said roll limiting spring further comprises a generally u-shaped leaf spring having a central portion affixed to the motor pod and two ends pivotally affixed to the chassis on opposite sides of the longitudinal axis at locations longitudinally spaced forward of the central portion.

8. The model car of claim 7 wherein said u-shaped leaf spring is generally planar in the relaxed state.

9. The model car of claim 7 wherein said u-shaped leaf spring central portion is fixedly attached to the motor pod to prohibit relative movement therebetween.

10. The model car of claim 9 wherein the ends of the U-shaped leaf spring are pivotally attached to the chassis.

11. A remote controlled battery powered on-road scale model car of the type having a straight rear axle and a non independent rear suspension, said model car comprising:

a chassis having a front and rear end with a longitudinal axis extending therebetween and means for mounting a row of batteries centrally along said longitudinal axis;

a pair of remotely steerable front wheels pivotally affixed to the chassis front end;

a pair of rear wheels interconnected by having a straight rear axle;

a motor pod supporting the rear axle and mounting means for attaching an electric motor; and a rear suspension electrically attaching the motor pod to the chassis rear end to permit limited vertical bounce movement and limited torsional roll movement about the longitudinal axis, said rear suspension spaced sufficiently from the chassis to provide clearance for a row of batteries oriented along the longitudinal axis thereby minimizing the mass moment of inertia of the model car measured about the longitudinal axis, said rear suspension comprising a pivot means for connecting said motor pod to the chassis enabling limited free relative movement therebetween about a transverse pivot axis and allowing free pivotal movement about a longitudinal pivot axis, a roll limiting spring cooperating with the motor pod and chassis providing elastic resistance to relative torsional movement about the chassis longitudinal axis, and a telescopic strut assembly having a forward end pivotally affixed to the chassis and a rearward end pivotally affixed to the motor pod, said strut having a spring which is elastically compressed and responds to an upward pivotal movement of the motor pod about the transverse pivot axis.

12. The model car of claim 11 wherein said roll limiting spring substantially entirely limits torsional movement of the motor pod relative to the chassis.

13. The model car of claim 11 wherein said telescopic strut comprises a single telescopic elongate member aligned in plan view with the longitudinal axis.

14. The model car of claim 13 wherein said telescopic strut is forwardly upwardly inclined relative to said longitudinal axis and spaced from the chassis sufficiently to provide battery storage therebetween.

15. The model car of claim 11 wherein aid roll limiting spring further comprises a U-shaped sway bar having a central portion affixed to the motor pod and pivotal about a sway bar axis generally parallel to the transverse pivot axis and two ends affixed to the chassis on opposite sides of the longitudinal axis at locations longitudinally spaced from the sway bar axis.

16. The model car of claim 15 wherein said two ends of the sway bar are pivotally attached to the chassis.

17. A remote controlled battery powered on-road scale model car of the type having a straight rear axle and a non independent rear suspension, said model car comprising:

a chassis having a front and rear end with a longitudinal axis extending therebetween and means for mounting a row of batteries centrally along said longitudinal axis;

a pair of remotely steerable front wheels pivotally affixed to the chassis front end;

a pair of rear wheels interconnected by having a straight rear axle;

a motor pod supporting the rear axle and mounting means for attaching an electric motor; and a rear suspension elastically attaching the motor pod to the chassis rear end to permit limited vertical bounce movement and limited torsional roll movement about the longitudinal axis, said rear suspension spaced sufficiently from the chassis to provide clearance for a row of batteries oriented along the longitudinal axis thereby minimizing the mass moment of inertia of the model car measured about the longitudinal axis, said rear suspension comprising a pivot means for connecting said motor pod to the chassis enabling limited free relative movement therebetween about a transverse pivot axis, a roll limiting spring cooperating with the motor pod and chassis providing elastic resistance to relative torsional movement about the chassis longitudinal axis, and a telescopic strut assembly having a forward end pivotally affixed to the chassis and a rearward end pivotally affixed to the motor pod, said strut having a spring which is elastically compressed and responds to an upward pivotal movement of the motor pod about the transverse pivot axis, said roll limiting spring comprising a generally U-shaped leaf spring having a central portion affixed to the motor pod and two ends pivotally affixed to the chassis on opposite side of the longitudinal axis at locations longitudinally spaced forward of the central portion.

18. The model car of claim 17 wherein said U-shaped leaf spring is generally planar in the relaxed state.

19. The model car of claim 17 wherein said U-shaped leaf spring central portion is fixedly attached to the motor pod to prohibit relative movement therebetween.

20. The model car of claim 19 wherein the ends of the U-shaped leaf spring are pivotally attached to the chassis.

* * * * *

UNITED STATES PATENT AND TRADEMARK OFFICE
CERTIFICATE OF CORRECTION

PATENT NO. : 5,338,247

DATED : August 16, 1994

INVENTOR(S) : Jeffrey A. Miles

It is certified that error appears in the above-indentified patent and that said Letters Patent is hereby corrected as shown below:

Column 2, Line 24   "t-bar"
should be --T-bar--.

Column 3, Line 4   after
"front wheels" insert --are--.

Column 3, Line 53
"u-shaped" should be --U-shaped--.

Column 3, Line 66   delete "a"
after "As".

Column 4, Line 34   delete "as
illustrated".

Column 4, Line 35   delete
"and struts of" and insert --in--.

UNITED STATES PATENT AND TRADEMARK OFFICE
CERTIFICATE OF CORRECTION

PATENT NO. : 5,338,247
DATED : August 16, 1994
INVENTOR(S) : Jeffrey A. Miles

It is certified that error appears in the above-indentified patent and that said Letters Patent is hereby corrected as shown below:

```
Column 4, Line 50                                before
"rear end," change "a" to --and--.

Column 6, Line 54, "u-shaped" should be --U-shaped--.

Column 6, Line 59, "u-shaped" should be --U-shaped--.

Column 6, Line 61, "u-shaped" should be --U-shaped--.

Column 7, Line 13
        delete "electrically" and insert
--elastically--.

Column 7, Line 46
        , delete "aid" and insert --said--.
```

Signed and Sealed this

Twentieth Day of December, 1994

Attest:

BRUCE LEHMAN

Attesting Officer     Commissioner of Patents and Trademarks